(12) United States Patent
Allen (10) Patent No.: US 11,873,797 B1
(45) Date of Patent: *Jan. 16, 2024

(54) NACELLE COUPLED FAIRINGS (71) Applicant: VIV Solutions LLC, Richmond, TX (US)

(72) Inventor: Donald Wayne Allen, Richmond, TX (US)

(73) Assignee: VIV Solutions LLC, Richmond, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/489,371

(22) Filed: Sep. 29, 2021

Related U.S. Application Data (60) Provisional application No. 63/091,914, filed on Oct. 14, 2020.

(51) Int. Cl.
*F03D 7/02* (2006.01)
*F03D 80/80* (2016.01)

(52) U.S. Cl.
CPC ........... *F03D 7/0296* (2013.01); *F03D 80/88* (2016.05); *F05B 2260/96* (2013.01)

(58) Field of Classification Search
CPC ........ F03D 7/0296; F03D 80/88; F03D 13/20; F05B 2260/96
See application file for complete search history.

(56) References Cited

U.S. PATENT DOCUMENTS

| | | | | |
|---|---|---|---|---|
| 1,104,254 A * | 7/1914 | Eddelbuttel-Reimers | ............... | B63B 21/663 114/67 R |
| 1,408,868 A * | 3/1922 | Dutcher | ............... | B63B 15/00 114/90 |
| 3,194,204 A * | 7/1965 | Nichols | ............... | B63B 21/663 367/106 |
| 4,171,674 A * | 10/1979 | Hale | ............... | E02F 3/905 114/243 |
| 4,398,487 A * | 8/1983 | Ortloff | ............... | B63B 35/4413 166/367 |
| 5,410,979 A | 5/1995 | Allen et al. | | |
| 5,722,340 A * | 3/1998 | Sweetman | ............... | F15D 1/10 405/211 |
| 9,022,075 B2 * | 5/2015 | Allen | ............... | B29C 39/08 138/106 |
| 9,523,456 B1 * | 12/2016 | Allen | ............... | E21B 17/22 |
| 10,865,910 B1 * | 12/2020 | Allen | ............... | F15D 1/10 |
| 2007/0215028 A1 * | 9/2007 | Lie | ............... | F16L 1/123 405/211 |
| 2013/0039702 A1 * | 2/2013 | West | ............... | F15D 1/10 405/216 |
| 2017/0369139 A1 * | 12/2017 | Arendts | ............... | B63H 9/067 |

FOREIGN PATENT DOCUMENTS

| | | | | |
|---|---|---|---|---|
| EP | 2436924 A1 * | 4/2012 | ............. | F03D 13/20 |
| WO | WO-2010088933 A2 * | 8/2010 | ........... | F03D 1/0608 |

* cited by examiner

*Primary Examiner* — Courtney D Heinle
*Assistant Examiner* — Ryan C Clark
(74) *Attorney, Agent, or Firm* — Aikin & Gallant, LLP (57) ABSTRACT

A vortex-induced vibration (VIV) suppression system comprising: a vortex-induced vibration (VIV) suppression device dimensioned to be coupled to a tower of a wind turbine and operable to rotate about a tower of the wind turbine to suppress a vortex-induced vibration; and a drive member coupled to the vortex-induced vibration suppression device and operable to align the vortex-induced vibration suppression device with a nacelle of the wind turbine.

18 Claims, 13 Drawing Sheets

NACELLE COUPLED FAIRINGS

CROSS-REFERENCE TO RELATED APPLICATION

The application is a non-provisional application of U.S. Provisional Patent Application No. 63/091,914, filed Oct. 14, 2020 and incorporated herein by reference.

FIELD

A vortex-induced vibration (VIV) suppression system having a VIV device operable to be aligned with a nacelle of a wind turbine to suppress VIV about the turbine tower. Other embodiments are also described herein.

BACKGROUND

Wind turbines have become an increasingly popular method of extracting energy from the environment. Most wind turbines are horizontal axis turbines with three blades that rotate around a horizontal axis and a nacelle that are suspended high in the air by a tower. The nacelle houses all power generating components of the wind turbine, including the generator, gearbox, drive train and brake assembly. The tower may include a tapered structure with a cylindrical cross section.

In recent years, wind turbine towers have progressed so that they are taller and taller in order to interrogate higher wind speeds. As wind turbine towers become taller, they are more susceptible to vortex-induced vibrations (VIV) due to their lower structural natural frequency and the higher vortex shedding frequency caused by higher wind speeds. This has created a need for suppression of the VIV.

SUMMARY

The present invention consists of fairing concepts for wind turbine towers to suppress VIV. Representatively, as previously discussed the tower of wind turbine is susceptible to VIV and therefore could benefit from a VIV suppression device. One such possible class of suppression devices are fairings. Fairings are typically free to weathervane (rotate) about the longitudinal axis of the tubular and are supported by collars to keep them from sliding along the tubular axis more than desired. Often, collars are used at each end of the fairing to maintain the desired axial position.

In the context of a wind turbine, however, the fairing must be properly aligned with the nacelle otherwise the blades could possibly contact the fairing causing a large structural, and possibly electrical, catastrophic failure of the wind turbine. These problems can also be caused by collars if they project too far outwards towards the turbine blades.

In addition, regarding the collars used to hold the fairing in the desired axial position, while they are designed for a specific diameter, it may be difficult to adapt the collars for use on another diameter. This can mean that an entire collar system must be built for even relatively small changes in diameter.

In one aspect, it is therefore desirable for the fairings to align themselves with the flow direction and approximately with the nacelle whenever possible. This not only minimizes the risk of failure but also minimizes the drag forces on the turbine, thereby reducing the cost of the foundation and possibly improving the performance of downstream wind turbines (through the reduction of turbulent flow downstream of the turbine).

It is further desirable for the fairing system to be approximately aligned with the wind direction and wind turbine such that it does not present significant risk for contact of the fairing system, or its components, with the wind turbine blades.

In one aspect, the invention is directed to a vortex-induced vibration (VIV) suppression system comprising: a vortex-induced vibration (VIV) suppression device dimensioned to be coupled to a tower of a wind turbine and operable to rotate about a tower of the wind turbine to suppress a vortex-induced vibration; and a drive member coupled to the vortex-induced vibration suppression device and operable to align the vortex-induced vibration suppression device with a nacelle of the wind turbine. In some aspects, the VIV suppression device is a fairing. In some aspects, the system further includes a collar coupled to the tower, the collar including a channel that receives an extension member of the fairing to maintain an axial position of the fairing along the tower and allows the fairing to rotate about the tower. In some aspects, the VIV suppression device includes a longitudinal axis that is aligned with a longitudinal axis of the nacelle of the wind turbine. In some aspects, the drive member is operable to rotate the VIV suppression device about the tower along with a rotation of the nacelle about the tower. The drive member may include a drive pin connecting the VIV suppression device to the nacelle. In some aspects, the drive member includes a motor coupled to the VIV suppression device that is operable to rotate the VIV suppression device to align the VIV suppression device with the nacelle. In some aspects, the VIV suppression device is a first fairing, and the system further comprises a second fairing coupled to the first fairing by a second drive member. In some aspects, the second drive member comprises a drive pin that couples the second fairing to the first fairing. In some aspects, the drive member includes a first stop (e.g., a fairing stop) coupled to the VIV suppression device and a second stop (e.g., a nacelle stop) coupled to the nacelle and which extends toward the VIV suppression device and comes into contact with the first stop when the VIV suppression device rotates to a position that is misaligned with the nacelle. In some aspects, the first stop is at an angle relative to the second stop.

In still further aspects, the invention is directed to a vortex-induced vibration (VIV) suppression system comprising: a fairing dimensioned to be coupled to a tower of a wind turbine, the fairing operable to rotate about a tower of the wind turbine to suppress a vortex-induced vibration; a collar coupled to a tower of a wind turbine, the collar operable to maintain an axial position of the fairing about the tower; and a drive pin coupled to the fairing, the drive pin operable to align the fairing with a nacelle of the wind turbine. In some aspects, the fairing is a first fairing and the drive pin is a first drive pin, and the VIV suppression system further comprises a second fairing coupled to the first fairing by a second drive pin. The fairing may include a body portion dimensioned to partially encircle the tower and a pair of arms that extend from the body portion to form a tail. In some aspects, a space is formed between the pair of arms along an entire length dimension of the tail. In some aspects, the fairing includes an afterbody and a strap dimensioned to connect the afterbody to the tower. In some aspects, the afterbody may include a round shape. In some aspects, the fairing includes a splitter plate and a strap dimensioned to connect the splitter plate to the tower. In some aspects, the collar includes a channel that receives an extension member of the fairing to maintain an axial position of the fairing along the tower while allowing the fairing to rotate about the tower. In some aspects, the system further includes a motor coupled to the fairing that is operable to rotate the fairing to align the fairing with the nacelle.

The above summary does not include an exhaustive list of all aspects of the present invention. It is contemplated that the invention includes all apparatuses that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments disclosed herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

In this section we shall explain several preferred embodiments with reference to the appended drawings. Whenever the shapes, relative positions and other aspects of the parts described in the embodiments are not clearly defined, the scope of the embodiments is not limited only to the parts shown, which are meant merely for the purpose of illustration. Also, while numerous details are set forth, it is understood that some embodiments may be practiced without these details. In other instances, well-known structures and techniques have not been shown in detail so as not to obscure the understanding of this description.

The terminology used herein is for the purpose of describing particular aspects only and is not intended to be limiting of the disclosure. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 1A:
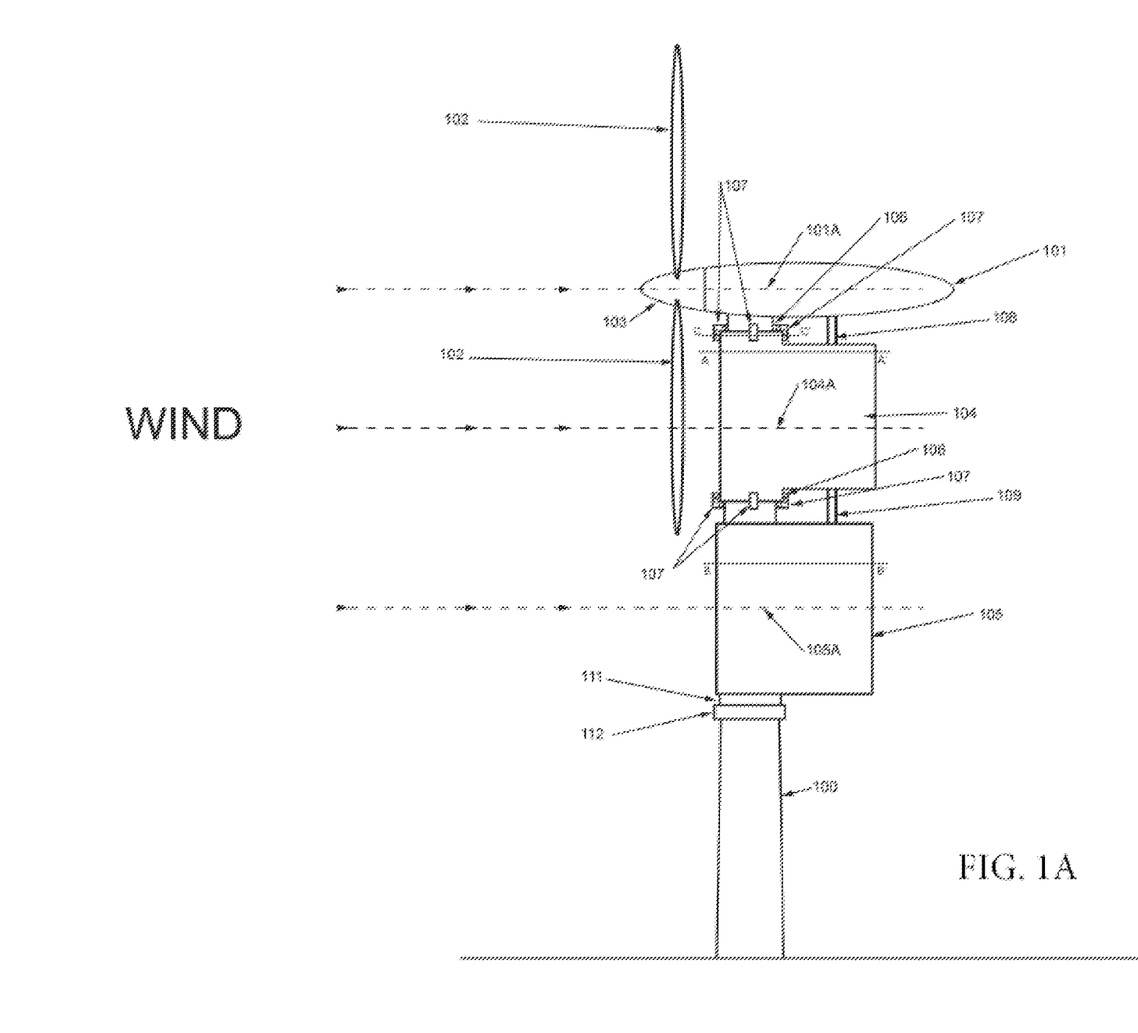
FIG. 1A is a side view of a wind turbine with two full body fairings that are driven by the nacelle.

Referring now to the invention in more detail, FIG. 1A illustrates a tower 100 with nacelle 101 and blades 102 attached to rotor 103. Fairing 104 surrounds tower 100 and is coupled to nacelle 101 through drive pin 108 and is supported by bearing mounts 107 and bearings 106. Fairing 105 also surrounds tower 100 and is coupled to fairing 104 through drive pin 109 and is supported by fairing extension 111 inserted into the channel of collar 112.

Again referring to FIG. 1A, fairing 104 is free to rotate around tower 100 but is restrained axially and radially by bearing mounts 107 which hold bearing 106. The rotation of fairing 104 is driven by nacelle 101 through drive pin 108. By way of background, nacelle 101 is configured to rotate with changes in wind direction. Typically, nacelle 101 will align itself and the associated blades 102 so that the turbine is pointing directly into the wind. For example, as illustrated by FIG. 1A, the nacelle axis 101A (i.e., longitudinal axis) should ideally be directly aligned with the wind direction (illustrated by the oncoming arrows). Similarly, it is desirable for fairings 104, 105 to also be aligned with the wind direction. For example, fairings 104, 105 may have a longitudinal axis 104A, 105A that should ideally be aligned with the wind direction for optimal VIV suppression. Due to the coupling of fairing 104 to nacelle 101 with drive pin 108, any rotation of nacelle 101 to align itself with the wind direction will also rotate fairing 104 so it is aligned with nacelle 101 and the wind direction as shown. In addition, as previously discussed, fairing 105 is coupled to fairing 104 by drive pin 109, therefore the rotation of nacelle 101 and fairing 104 will drive the rotation of fairing 105 so it is also aligned with the wind direction. Fairing 105 is also restrained axially and radially by collar 112 through fairing extension 111. Fairing extension 111 may be a structure that extends into a channel of collar 112. As previously discussed, collar 112 is at a fixed axial position along tower 100 such that it prevents any of the fairings coupled thereto from moving axially along tower 100 (while allowing for the fairings to rotate around tower 100). Fairing extension 111 is optional, as are bearings 106 and bearing mounts 107. Bearings 106 are used to minimize friction and thus minimize the force required to rotate fairing 104.

Fairings 104 and 105 may be of any suitable size, shape, and geometry. Drive pins 108 and 109 may be of any suitable cross section, quantity, size, or length. Any number, size, shape, and geometry of bearing mounts 107 and bearings 106 may be used and bearing mounts 107 may optionally encircle the full circumference of tower 100. Fairings 104 and 105 may be restrained axially by any suitable means; bearing mounts 107, bearings 106, and collar 112 are just examples of methods used to axially restrain fairings 104 and 105. Collar 112 may also contain bearing mounts or bearings to minimize friction when rotating fairings 104 and 105. While FIG. 1A shows two fairings present, any number of fairings may be present. Fairings located near, or below, the bottom of blades 102 may be simply free to rotate with changes in wind direction and do not necessarily require drive pins 108 or 109. Other appurtenances may also be present, and these appurtenances may, or may not, assist with the axial support or rotational freedom or inhibition of fairings 104 and 105. Other structures may be used in place of drive pins 108 and 109 to couple fairings 104 and 105 with each other or with nacelle 101 including, but not limited to, bolts, nuts, clamps, rods, struts, collars, other fairings or similar structures, or channels. While FIG. 1A shows a nacelle 101 with a rotor 103 and blades 102, the concept depicted herein applies to any structure or wind turbine configuration. Any number of blades 102 or rotors 103 may be present. The invention may apply to turbines on land or on water, for example on fixed or floating wind turbines.

Still referring to FIG. 1A, fairings 104 and 105, fairing extension 111, collar 112, bearing supports 107, bearings 106, and drive pins 108 and 109 may be made of any suitable material including, but not limited to, plastic, metal, composite, and wood.

Figure 1B:
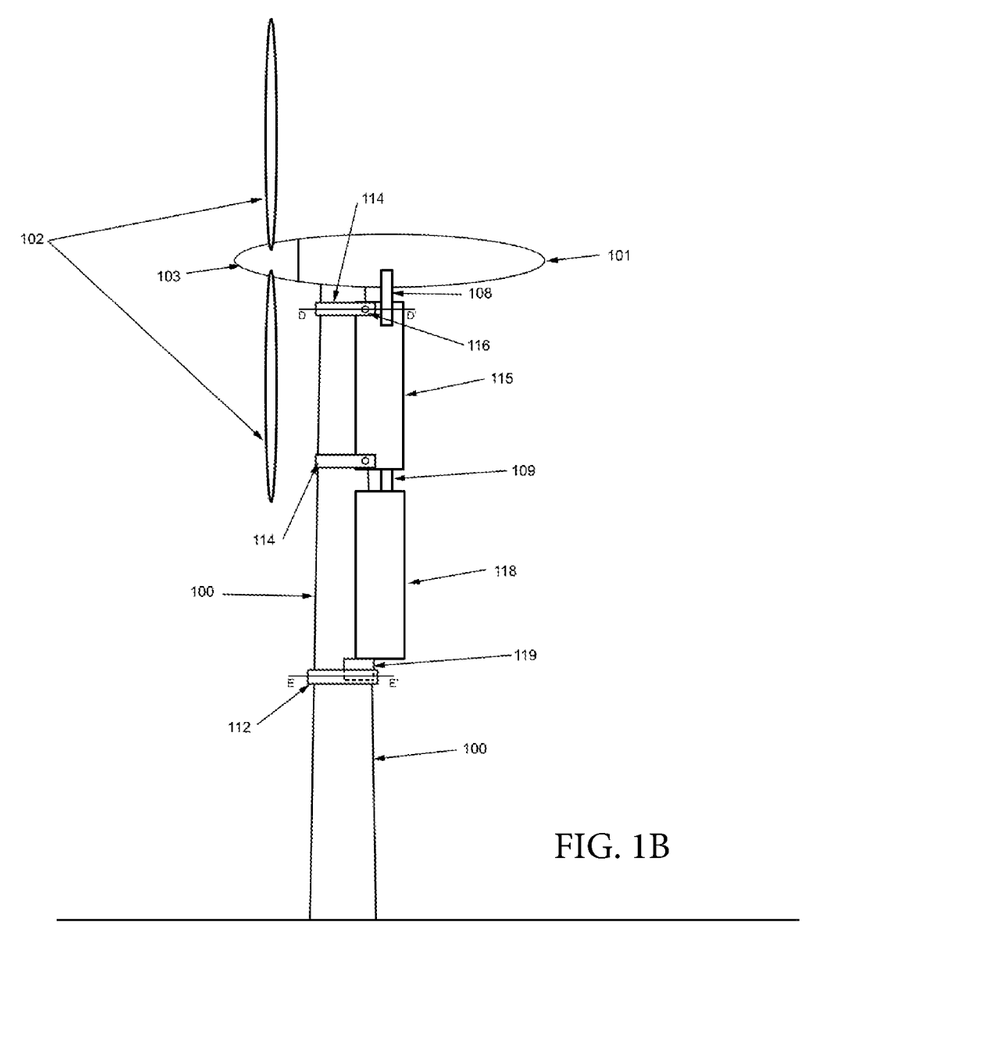
FIG. 1B is a side view of a wind turbine with two partial body fairings that are driven by the nacelle.

Referring now to FIG. 1B, FIG. 1B shows a tower 100 with nacelle 101 and blades 102 attached to rotor 103. Fairing 115 is adjacent to tower 100 and held in place by straps 114 which are attached to fairing 115 by bolts 116. Fairing 115 is coupled to nacelle 101 by drive pin 108. Fairing 118 is also adjacent to tower 100 and coupled to fairing 115 by drive pin 109. Fairing 118 is restrained both axially and radially by collar 112 through fairing extension piece 119.

Again referring to FIG. 1B, fairings 115 and 118 cover only a portion of the circumference of tower 100. Fairing 115 is restrained radially by straps 114 and fairing 115 and straps 114 are free to rotate around tower 100 but coupled to nacelle 101 through drive pin 108. As a result, similar to the previous configuration discussed in reference to FIG. 1A, the rotation of fairing 115 may be driven by the rotation of nacelle 101, which as previously discussed is configured to rotate with changes in wind direction. In addition, due to the coupling of fairing 118 to fairing 115 by drive pin 109, fairing 118 may also rotate along with fairing 115 and nacelle 101. Fairing 118, however, also includes a fairing extension piece 119 inserted into a channel in collar 112 which axially and radially restrains fairing 118. A fairing extension piece 119 and collar 112 could also optionally reside at the top of fairing 118.

Still referring to FIG. 1B, any number of fairings 115 and 118 may be present. Similarly, any number of straps 114, drive pins 108 and 109, bolts 116, collars 112, and fairing extension pieces 119 may be present. These components, and those depicted in FIG. 1A, may be mixed and matched, used or not used, as necessary.

Still referring to FIG. 1B, fairings 115 and 118, drive pins 108 and 109, collar 112, fairing extension pieces 119, straps 114, and bolts 116 may each be made of any suitable material including, but not limited to, plastic, metal, composite, or wood.

Figure 1C:
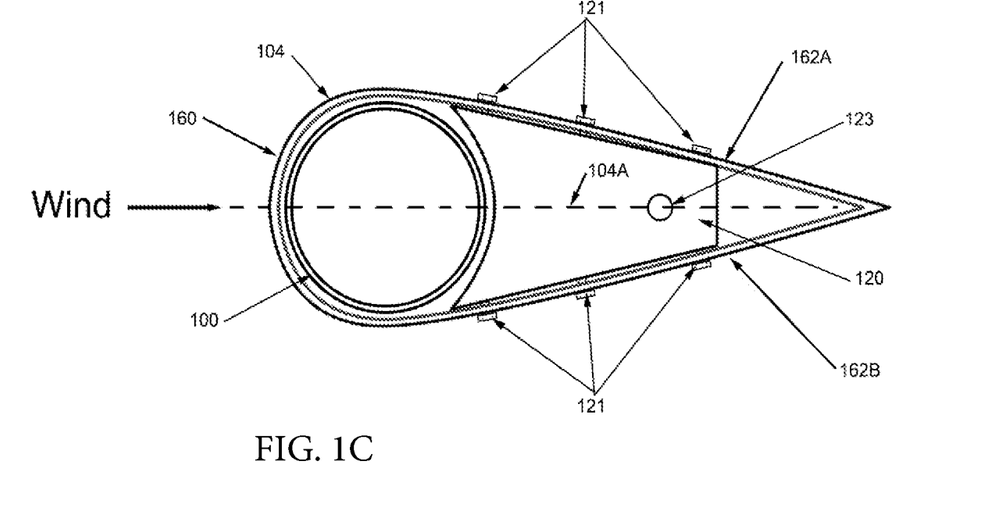
FIG. 1C is a cross section of a fairing having a narrow tail.

Referring now to FIG. 1C, this figure shows cross section A-A' through fairing 104 of FIG. 1A. As previously discussed, fairing 104 is positioned around tower 100. From this view, it can be seen that fairing 104 may include a body or nose portion 160 that is positioned around tower 100 and side walls or arms 162A, 162B that extend from the nose portion 160 and outward beyond tower 100 to form a tail portion. The body or nose portion 160 and arms 162A, 162B may be separate pieces, or integrally formed as a single piece such that fairing 104 is one integrally formed structure. In some aspects, arms 162A, 162B may extend from nose portion 160 and meet at their ends such that fairing 104 has a tear drop or triangular shaped structure as shown. Fairing 104 may further include an internal support 120 which is attached to fairing arms 162A, 162B through fasteners 121. Internal support 120 may have an opening 123.

Again referring to FIG. 1C, fairing 104 is free to rotate around tower 100 so that it is aligned with the nacelle of the wind turbine and the wind. Representatively, as previously discussed, for optimal VIV suppression, it is desirable for the axis 104A of fairing 104 to be aligned with the wind turbine nacelle, and in turn the wind direction, as shown. From this view, it can be seen that axis 104A is, or runs parallel to, the chord or length dimension of fairing 104, which is typically measured from the nose 160 to the end of the tail. Accordingly, said another way, the nose 160 of fairing 104 may be understood as directly facing or being aligned with the wind direction.

Internal support 120 is used to help fairing 104 maintain its shape under high wind loading. Opening 123 is used for receiving a drive pin (e.g., drive pin 108). Any number of internal supports 120, fasteners 121, and openings 123 may be present. Internal support 120 may be of any suitable size, shape, quantity, or geometry and may be attached to fairing 104 by any suitable means including, but not limited to, fastening, welding, clamping, or chemical bonding. Opening(s) 123 may be of any suitable size or shape and may be slightly larger, or significantly larger, than the mating drive pin.

Still referring to FIG. 1C, internal support 120 and fasteners 121 may be made of any suitable material including, but not limited to, plastic, metal, composite, or wood.

Figure 1D:
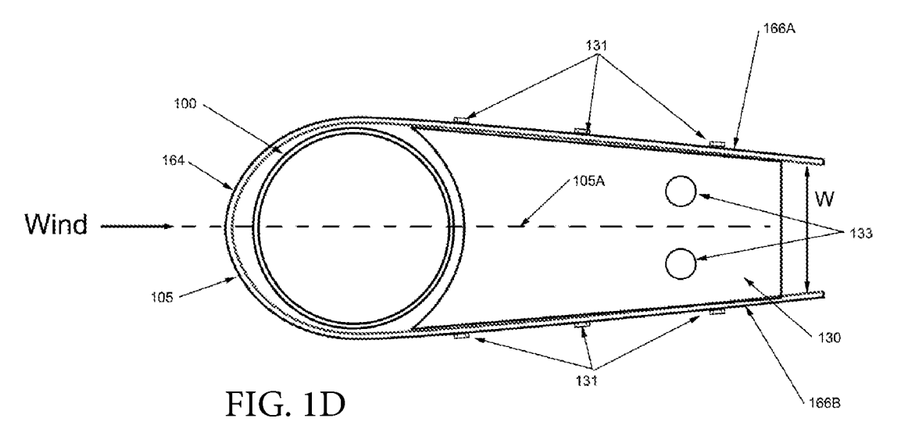
FIG. 1D is a cross section of a fairing having a wide tail.

Referring now to FIG. 1D, this figure shows cross section B-B' through fairing 105 of FIG. 1A. As previously discussed, fairing 105 is positioned around tower 100. From this view, it can be seen that similar to fairing 104, fairing 105 may include a body or nose portion 164 that is positioned around tower 100 and side walls or arms 166A, 166B that extend from the nose portion 164 and outward beyond tower 100 to form a tail portion. The body or nose portion 164 and arms 166A, 166B may be separate pieces, or integrally formed as a single piece such that fairing 104 is one integrally formed structure. In some aspects, arms 166A, 166B may extend from nose portion 164 and almost parallel to one another such that they form a "U" shaped structure as shown. In this configuration, fairing 105 is therefore considered to have a relatively wide tail. For example, instead of the arms 166A, 166B meeting at their ends, they remain spaced apart along their entire length dimension (e.g., along axis 105A) such that the fairing has a relatively wide width (W) as shown. This configuration illustrates that the fairings presented in this invention may be of any size or shape.

In addition, similar to the previous configuration, for optimal VIV suppression, it is desirable for the axis 105A of fairing 105 to be aligned with the wind turbine nacelle, and in turn the wind direction, as shown. From this view, it can be seen that axis 105A is, or runs parallel to, the chord or length dimension of fairing 105, which is typically measured from the nose 164 to the end of the tail. Accordingly, said another way, the nose 164 of fairing 105 may be understood as directly facing or being aligned with the wind direction.

Fairing 105 may further include an internal support 130 which is attached to arms 166A, 166B of fairing 105 through fasteners 131. Internal support 130 has openings 133. As previously discussed, fairing 105 is free to rotate around tower 100. Internal support 130 may have more than one opening 133 to optionally mate with more than one drive pin (e.g., drive pin 109). Internal support 130 and fasteners 131 may be made of any suitable material.

Figure 1E:
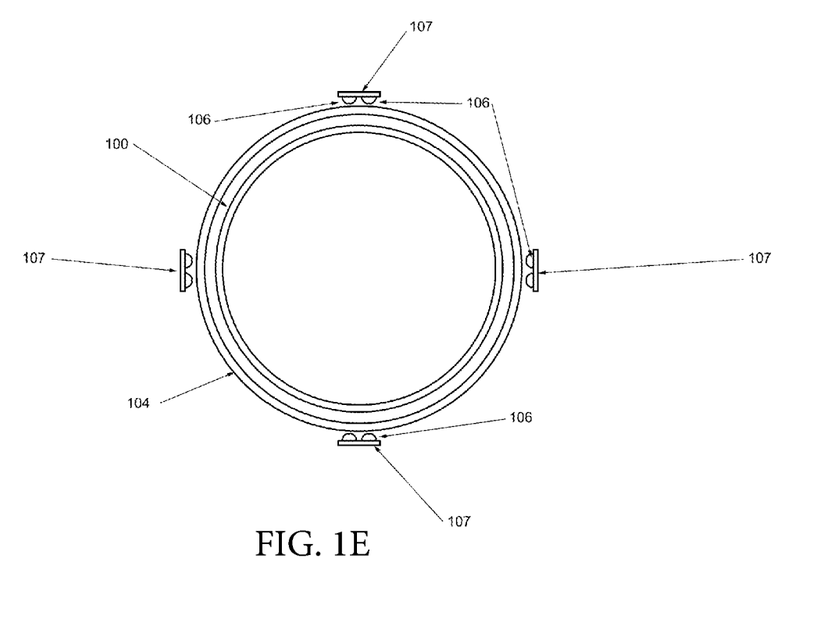
FIG. 1E is a cross section of the top of a fairing inside of four bearing mounts.

Referring now to FIG. 1E, this figure shows cross section C-C' through fairing 104 of FIG. 1A. From this view, it can be seen that fairing 104 is positioned around tower 100 and centralized by bearing mounts 107 and bearings 106. Bearing mounts 107 may be used to support and keep fairing 104 in place while bearings 106 are used to reduce the friction when fairing 104 is rotated around tower 100. Bearing mounts 107 and bearings 106 may be made of any suitable material. Other bearing types may also be used in place of, or in conjunction with, bearing mounts 107 and bearings 106 including, but not limited to, ball bearings, roller bearings, linear bearings, slide bearings, jewel bearings, and frictionless bearings. Low friction materials such as Teflon may also be used in place of, or in conjunction with, bearings 106 to minimize rotational friction of fairing 104.

Figure 1F:
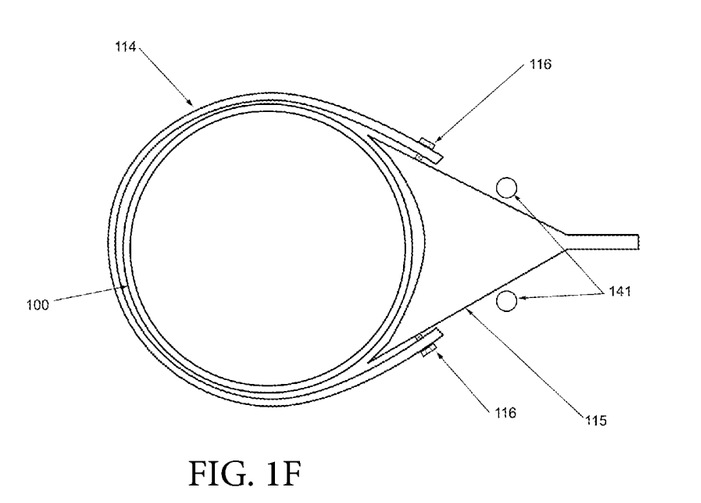
FIG. 1F is a cross section of a partial body fairing with a strap.

Referring now to FIG. 1F, this figure shows cross section D-D' through fairing 115 of FIG. 1B. Fairing 115 may include strap 114 to hold fairing 115 around tower 100. Strap 114 is attached to fairing 115 with fasteners 116 and drive pins 141 are present on the outside of fairing 115. Strap 114 is configured to keep fairing 115, which covers only part of the circumference of tower 100, adjacent to tower 100. Strap 114 and fairing 115 are free to rotate but can be constrained or controlled by drive pins 141 which are attached to the nacelle or optionally attached to an adjacent fairing. Fasteners 116 keep strap 114 attached to fairing 115 but other methods may be used for attaching strap 114 to fairing 115 including clamping, welding, chemical bonding, and riveting. FIG. 1F illustrates that fairing 115 does not need to envelope the entire circumference of tower 100 and that drive pins 141 may be external to fairing 115 or internal to fairing 115.

Figure 1G:
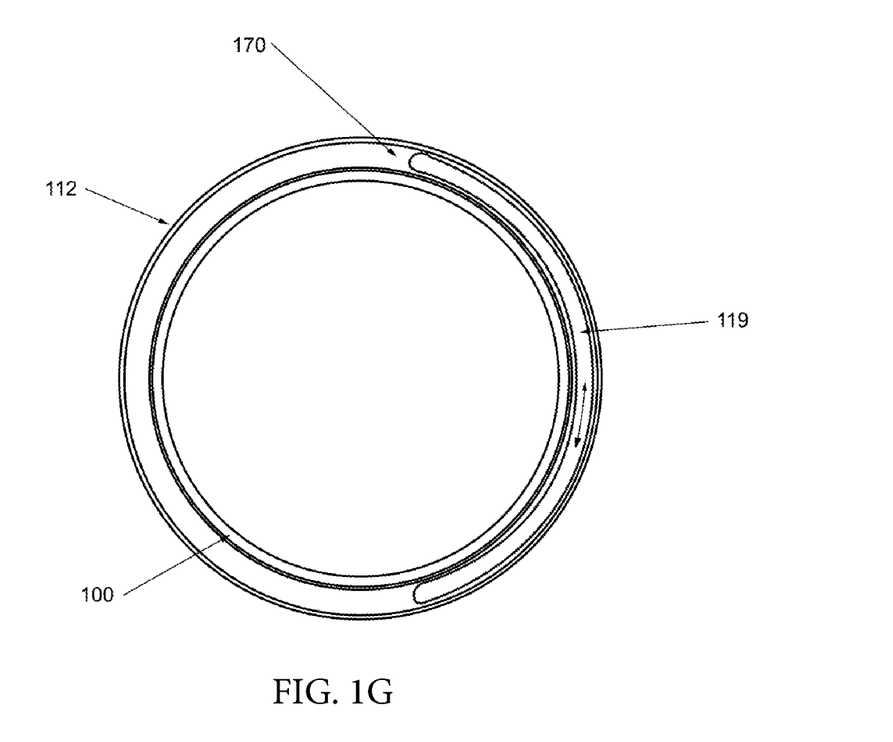
FIG. 1G is a cross section showing the bottom of a fairing inserted into a collar channel.

Referring now to FIG. 1G, FIG. 1G is a cross section E-E' through extension piece 119 and collar 112 of FIG. 1B. From this view, it can be seen that fairing extension piece 119 is inserted into collar 112 which is clamped around tower 100. Representatively, fairing extension piece 119 can be inserted into a channel 170 formed in collar 112 such that the fairing extension piece 119 (and in turn the associated fairing) rotates within channel 170 around tower 100 as illustrated by the arrow. The channel 170, however, also radially and axially constrains the fairing to which fairing extension piece 119 is attached. Collar 112 may have any number of channels or may consist of only one channel. For example, collar 112 may consist of a channel that faces with the open side upward and a channel with an open side downward with the closed sides attached to each other. Collar 112 may include any number of circumferential or radial segments depending upon the chosen geometry of the fairing extension piece 119 and other desired features such as ease of installation. For example, collar 112 may include two halves each covering 180 degrees of the tower 100 circumference and may also have shims or inserts on the inside of its circumference to act as spacers.

Figure 1H:
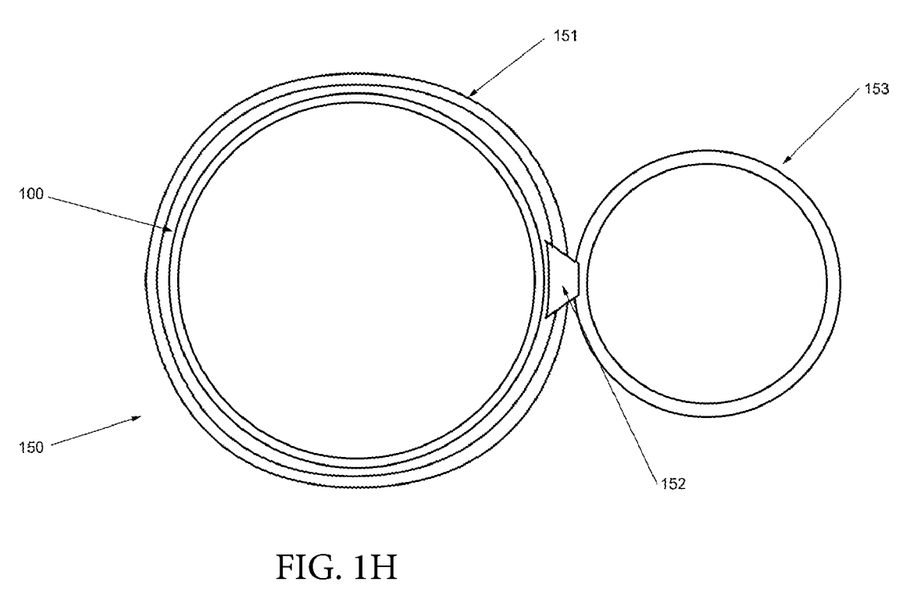
FIG. 1H is a round after body used as a fairing and kept adjacent to a tower with a strap.

Referring now to FIG. 1H, FIG. 1H shows tower 100 surrounded by fairing 150. In this configuration, fairing 150 includes a strap 151 connected to afterbody 153 through coupler 152. Similar to the previously discussed fairings, fairing 150 is free to rotate around tower 100. Coupler 152 connects afterbody 153 to strap 151 by any suitable means including clamping, fastening, welding, and chemical bonding or coupler 152 may be integral with strap 151 or afterbody 153. Afterbody 153 may be any relatively rigid structure and is shown as being round but may be any suitable shape including, but not limited to, circular, triangular, square, polygonal, elliptical, rounded, or a combination thereof. The presence of afterbody 153, almost regardless of shape, can provide some drag reduction and VIV suppression for tower 100. Coupler 152, may also be of any suitable shape. Fairing 150, coupler 152, and afterbody 153 may be made of any suitable material.

Figure 1I:
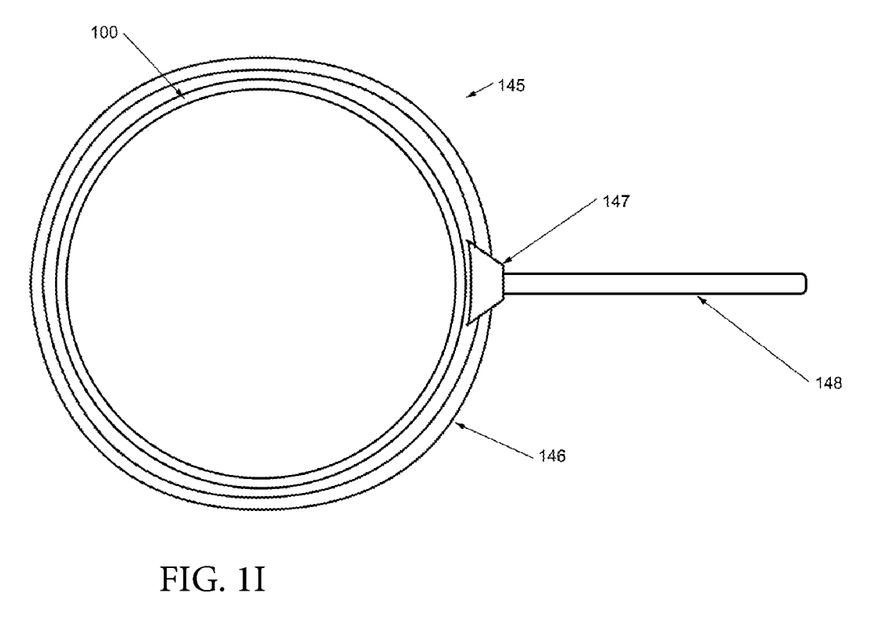
FIG. 1I is a single splitter plate kept adjacent to a tower with a strap.

Referring now to FIG. 1I, FIG. 1I shows tower 100 surrounded by fairing 145. Fairing 145 may include strap 146 connected to splitter plate 148 through coupler 147. Splitter plate 148 is another example of an afterbody shape that can be used for afterbody 153 as depicted in FIG. 1H. Splitter plate 148 may be a relatively rigid structure that may have any length, height, or thickness and any number of splitter plates may be used. Any number of couplers 147 may be used also. Splitter plate 148 and coupler 147 may be made of any suitable material. Splitter plate 148 may have straight edges or edges that are not straight. Splitter plate 148 may be fairly rigid or may be flexible.

Figure 2:
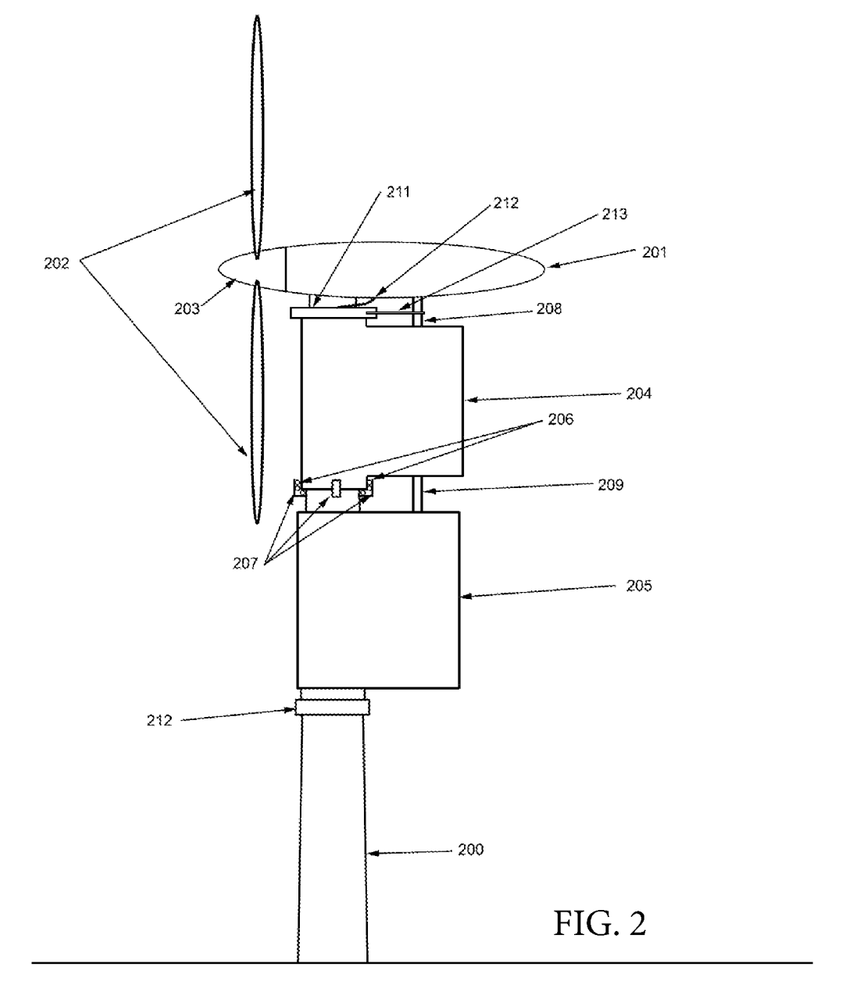
FIG. 2 is a side view of a wind turbine with a motor for keeping the fairings in proper alignment.

Referring now to FIG. 2, FIG. 2 shows tower 200 with nacelle 201 having rotor 203 and blades 202. Fairing 204 may optionally be centralized around tower 200 with bearing mounts 207 and bearings 206. Fairing 204 is driven by fairing motor 212 which can be connected to optional drive pin 208 by rod 213. Fairing 205 is coupled to fairing 204 by drive pin 209. Optional collar 212 can keep fairing 205 axially aligned as previously discussed such that it does not slide down tower 200.

Again referring to FIG. 2, fairing motor 212 can be used to assist with rotating fairings 204 and 205 if the motor rotating nacelle 201 is insufficient or if it is desired, for any reason, to drive nacelle 201 differently than fairings 204 and 205. Any size or quantity of fairing motor 212 may be used. Fairing motor may drive fairing 204 directly or may use rod 213 to rotate fairing 204 through drive pin 208. Fairing motor 212 may be powered through nacelle 201 or may be powered through tower 200. The power source for fairing motor 212 may be any suitable source including electrical or hydraulic sources.

Figure 3A:
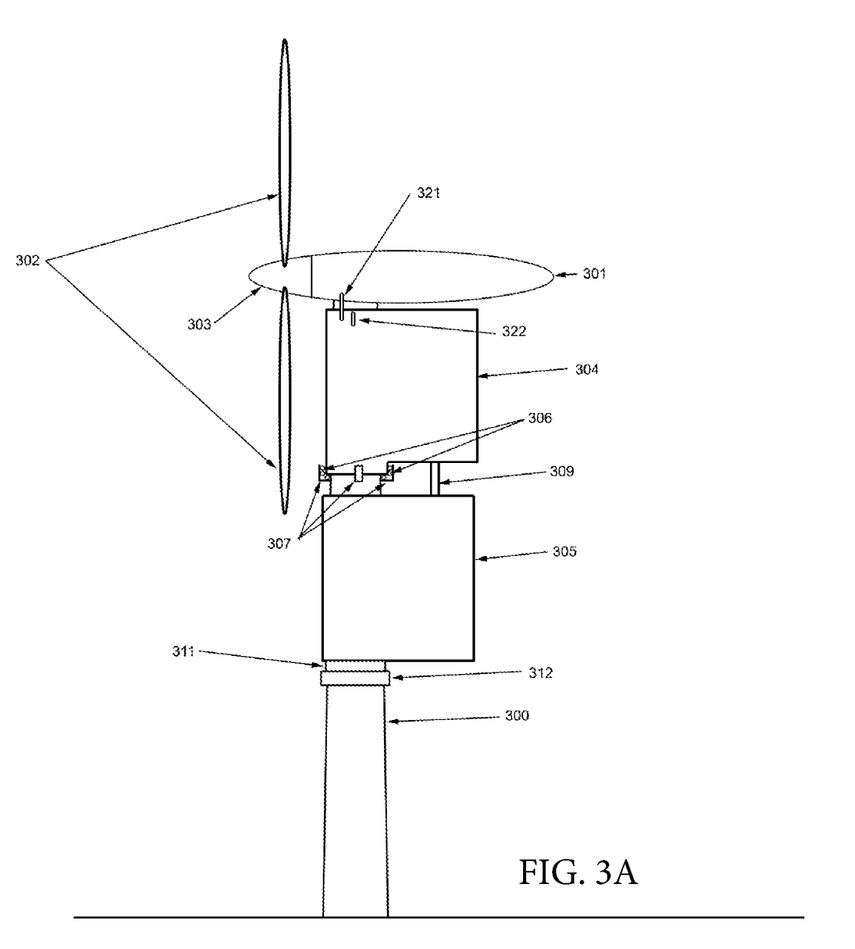
FIG. 3A is a side view of a fairing that is free to rotate but with restricted rotation using stops.

Referring now to FIG. 3A, FIG. 3A shows tower 300 with nacelle 301 having rotor 303 and blades 302. Fairing 304 may be optionally centralized or supported on tower 300 with bearing mounts 307 and bearings 306. Fairing 304 is free to rotate around tower 300 but is limited in its rotation relative to nacelle 301 by nacelle stop 321 and fairing stop 322. Fairing 305 is coupled to fairing 304 by drive pin 309 and supported by collar 312 through fairing extension piece 311. From this illustration, it can be understood that fairing 304 does not need to be driven by nacelle 301 but instead can be loosely coupled to nacelle 301 using nacelle stop 321 and fairing stop 322. Representatively, the nacelle stop 321 and fairing stop 322 will come into contact when nacelle 301 rotates or fairing 304 rotates too much relative to nacelle 301. In this aspect, the nacelle stop 321 and fairing stop 322 will drive the rotation and/or maintain the alignment between the nacelle 301 and fairing 304 in the absence of a drive pin between the nacelle 301 and fairing 304 such that the drive pin may be omitted.

Nacelle stop 321 and fairing stop 322 may consist of any suitable size or shape but generally will protrude from the surface of nacelle 301 or fairing 304, respectively. Nacelle stop 321 further extends below nacelle 301 such that it overlaps fairing 304 and is at least partially axially aligned with fairing stop 322 as shown. In this aspect, when nacelle 321 rotates, the nacelle stop 321 will contact fairing stop 322, which in turn will cause fairing 304 to rotate along with nacelle 321. Similarly, if fairing 304 begins to rotate more than or differently than nacelle 301, the fairing stop 322 will catch on the nacelle stop 321 and prevent over rotation of the fairing 322. In this aspect, the nacelle stop 21 and fairing stop 322 can help to maintain the alignment between nacelle 301 and fairing 304 and/or drive a rotation of fairing 304. Nacelle stop 321 and fairing stop 322 may be made of any suitable material and may also be integral to nacelle 301 or fairing 304. Fairing 305 may be loosely coupled to fairing 304 in that drive pin 309 may allow some rotation of fairing 305 relative to fairing 304.

Figure 3B:
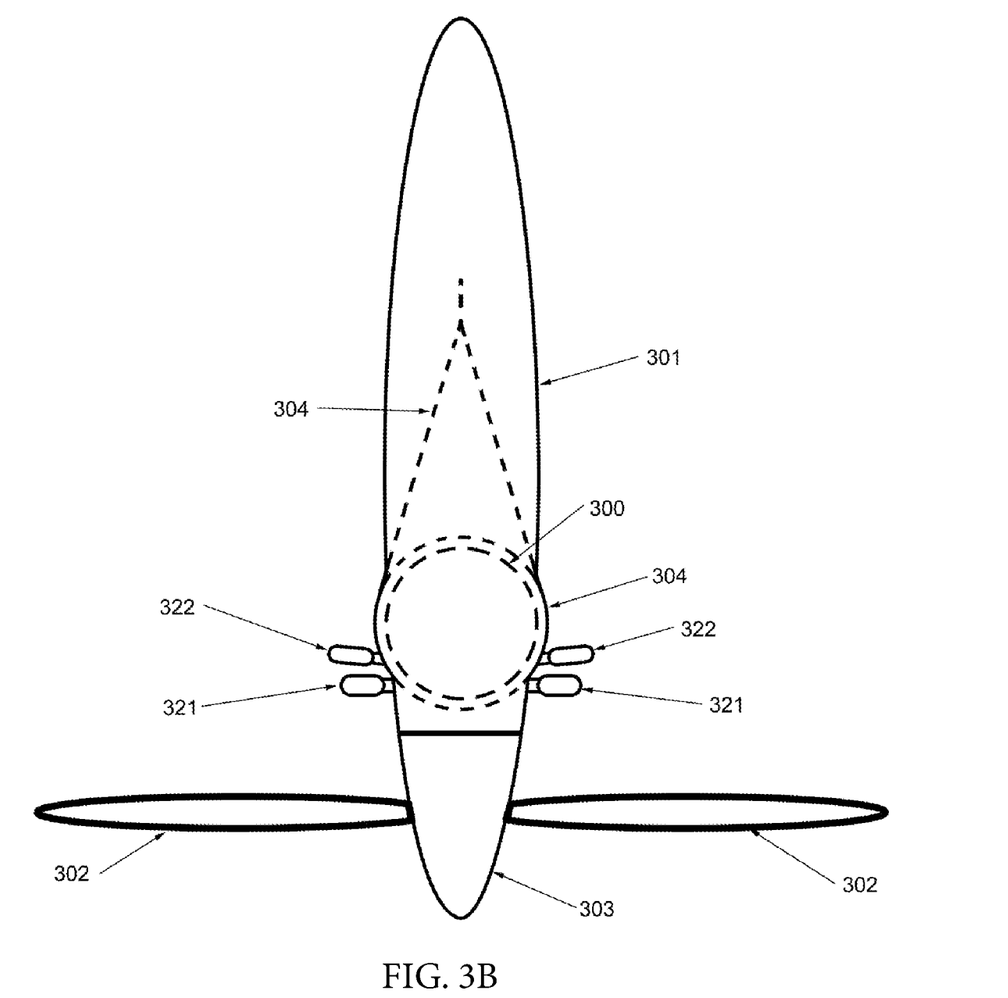
FIG. 3B is a top plan view of the fairing of FIG. 3A having restricted rotation using stops.
Figure 3C:
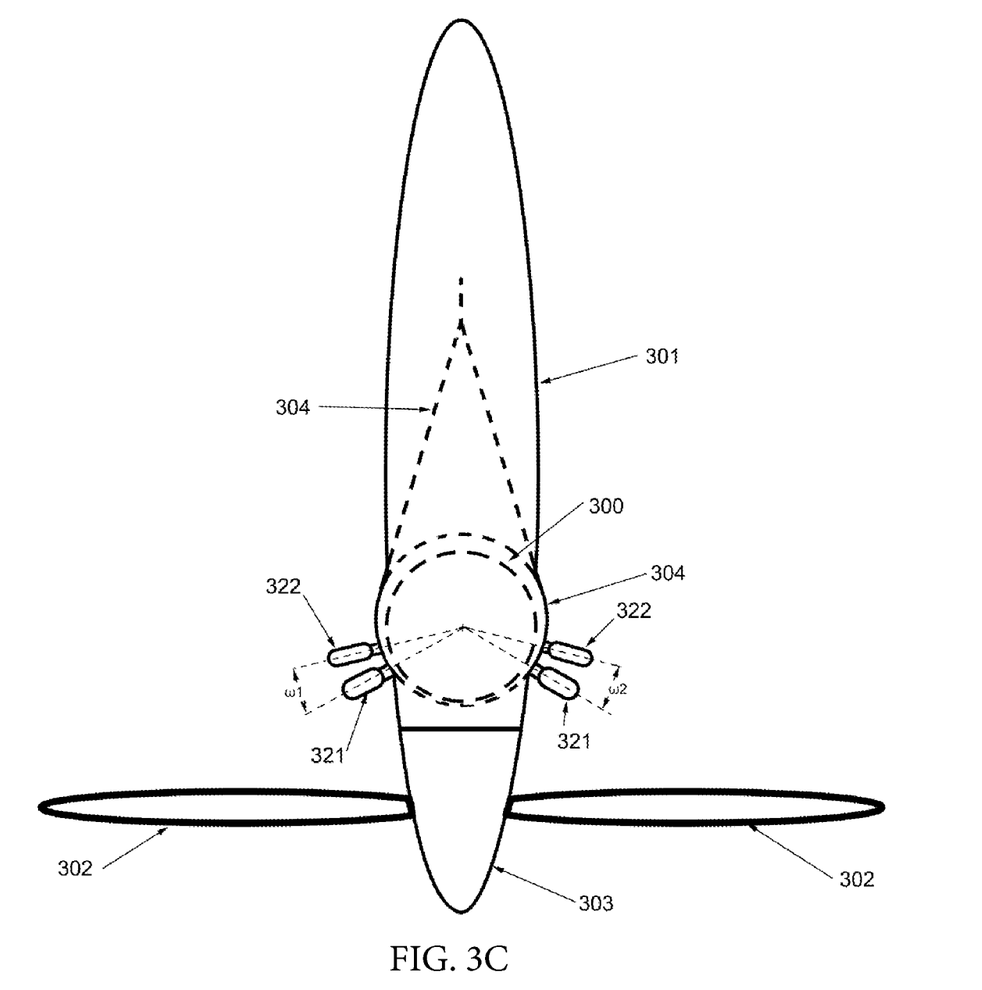
FIG. 3C is a top plan view of the fairing of FIG. 3A having restricted rotation using stops.

Referring now to FIG. 3B and FIG. 3C, FIG. 3B and FIG. 3C are top plan views of the fairing of FIG. 3A. From this view, the operation of the nacelle stop 321 and fairing stop 322 can be more clearly understood. Representatively, from this view, it can be seen that nacelle stop 321 is attached to and protrudes outwardly (and downward as shown in FIG. 3A) from the surface of nacelle 301. Similarly, fairing stop 322 is attached to and protrudes outwardly from the surface of fairing 304. It can further be seen from this view that nacelle stop 321 and fairing stop 322 are aligned with one another. In this aspect, a rotation of nacelle 301 will cause nacelle stop 321 to contact fairing stop 322. This, in turn, will drive a rotation of fairing 304 along with nacelle 301 so that the fairing 304 remains aligned with nacelle 301. Similarly, if fairing 304 begins to over rotate or rotate differently from nacelle 301, fairing stop 322 will contact the nacelle stop 321 to maintain an alignment between fairing 304 and nacelle 301.

In addition, as illustrated by FIG. 3C, in some aspects, nacelle stop 321 may be at an angle and fairing stop 322 may similarly be at an angle found optimal for the performance of fairing 304 when, instead of fairing 304 being driven by nacelle 301, fairing 304 is free to rotate and thus nacelle stop 321 and fairing stop 322 restrict the relative angle (w1 or w2) between fairing 304 and nacelle 301. This restriction also prevents fairing 304 from interfering with blades 302 when it is free to rotate. For example, in some aspects, nacelle stop 321 may be at an angle relative to fairing stop 322. In other words, nacelle stop 321 is not parallel to fairing stop 322. I still further aspects, there may be a distance between nacelle stop 321 and fairing stop 322 as shown. FIG. 3C shows representative angles (w1, w2) of the nacelle stop 321 relative to the fairing stop 322 that may be particularly selected to maintain alignment between nacelle 301 and fairing 304. The angle may be measured relative to the center of rotation of the fairing. For example, in some aspects, the angle (w1, w2) of nacelle stop 321 relative to fairing stop 322 may be within a range between approximately 0 degrees and 30 degrees, or between 0 degrees and 45 degrees, or between 0 and 57.5 degrees.

The above aspects of this invention may be mixed and matched in any manner. In broad embodiment, the present invention consists of one or more fairings that are coupled to a wind turbine nacelle, or similar structure, so that the possibility of the fairings contacting the turbine blades is minimized. The fairings may taper to accommodate the diameter change of the tower over their length/height and all materials may be mixed and matched as desired. The fairings may be fairly rigid or may be flexible. This system may be used for other wind turbines such as vertical axis turbines, turbines with different numbers, shapes, or geometries of blades, etc. provided that the fairings are coupled to a structure that is connected to the wind turbine that rotates with changes in wind direction.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. For several of the ideas presented herein, one or more of the parts may be optional. The invention should therefore not be limited by the above described embodiment, method, and examples, but by all embodiments and methods within the scope and spirit of the invention.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. For several of the ideas presented herein, one or more of the parts may be optional. The invention should therefore not be limited by the above described embodiment, method and examples, but by all embodiments and methods within the scope and spirit of the invention.

What is claimed is:

1. A vortex-induced vibration (VIV) suppression system comprising:
   a vortex-induced vibration (VIV) suppression device dimensioned to be coupled to a tower of a wind turbine and operable to rotate about the tower of the wind turbine to suppress a vortex-induced vibration; and
   a stop fixedly coupled to the vortex-induced vibration suppression device, the stop includes a first portion that protrudes from an external surface of the vortex-induced vibration suppression device and extends radially outward from a longitudinal axis of the vortex-induced vibration suppression device and a second portion that is at an angle to the first portion, and the stop is configured to align the vortex-induced vibration suppression device with a nacelle of the wind turbine and allow for rotation of the vortex-induced vibration suppression device relative to the nacelle within a predetermined angle.

2. The VIV suppression system of claim 1 wherein the VIV suppression device is a fairing.

3. The VIV suppression system of claim 2 further comprising a collar coupled to the tower, the collar comprising a channel that receives an extension member of the fairing to maintain an axial position of the fairing along the tower and allows the fairing to rotate about the tower.

4. The VIV suppression system of claim 1 wherein the VIV suppression device comprises a longitudinal axis that is aligned with a longitudinal axis of the nacelle of the wind turbine.

5. The VIV suppression system of claim 1 further comprising a motor coupled to the VIV suppression device that is operable to rotate the VIV suppression device to align the VIV suppression device with the nacelle.

6. The VIV suppression system of claim 1 wherein the VIV suppression device is a first fairing, and the system further comprises a second fairing coupled to the first fairing.

7. The VIV suppression system of claim 6 wherein a fastener couples the second fairing to the first fairing.

8. The VIV suppression system of claim 1 wherein the stop comprises a first stop protruding outwardly from the external surface of the VIV suppression device and a second stop is coupled to the nacelle which extends toward the VIV suppression device and comes into contact with the first stop when the VIV suppression device rotates to a position that is misaligned with the nacelle.

9. The VIV suppression system of claim 8 wherein the first stop is at an angle relative to the second stop or the first stop and second stop have a distance between them that allows for rotation of the VIV suppression device relative to the nacelle within the predetermined angle of up to 57.5 degrees.

10. A vortex-induced vibration (VIV) suppression system comprising:
- a fairing dimensioned to be coupled to a tower of a wind turbine, the fairing operable to rotate about the tower of the wind turbine to suppress a vortex-induced vibration;
- a collar coupled to the tower of a wind turbine, the collar operable to maintain an axial position of the fairing about the tower; and
- a stop fixedly coupled to the fairing, the stop having a first portion that extends radially outwardly from a longitudinal axis of the fairing and a second portion that is at an angle to the first portion such that the stop is configured to align the fairing with a nacelle of the wind turbine and allow for rotation of the fairing relative to the nacelle within a predetermined angle.

11. The VIV suppression system of claim 10 wherein the fairing is a first fairing and the stop is a first stop, and the VIV suppression system further comprises a second fairing coupled to the first fairing by a second stop.

12. The VIV suppression system of claim 10 wherein the fairing comprises a body portion dimensioned to partially encircle the tower and a pair of arms that extend from the body portion to form a tail.

13. The VIV suppression system of claim 12 wherein a space is formed between the pair of arms along an entire length dimension of the tail.

14. The VIV suppression system of claim 10 wherein the fairing comprises an afterbody and a strap dimensioned to connect the afterbody to the tower.

15. The VIV suppression system of claim 10 wherein the fairing comprises a splitter plate and a strap dimensioned to connect the splitter plate to the tower.

16. The VIV suppression system of claim 10 wherein the collar comprises a channel that receives an extension member of the fairing to maintain an axial position of the fairing along the tower while allowing the fairing to rotate about the tower.

17. The VIV suppression system of claim 10 further comprising a motor coupled to the fairing that is operable to rotate the fairing to align the fairing with the nacelle.

18. The VIV suppression system of claim 10 wherein the stop is a first stop, and the system further comprises a second stop coupled to the nacelle, and the second stop is non-parallel to the first stop such that the rotation of the fairing relative to the nacelle is within the predetermined angle of up to 57.5 degrees.

* * * * *